United States Patent [19]
Wiedeman et al.

[11] Patent Number: 5,918,157
[45] Date of Patent: *Jun. 29, 1999

[54] SATELLITE COMMUNICATIONS SYSTEM HAVING DISTRIBUTED USER ASSIGNMENT AND RESOURCE ASSIGNMENT WITH TERRESTRIAL GATEWAYS

[75] Inventors: Robert A. Wiedeman, Los Altos; Paul A. Monte, San Jose, both of Calif.

[73] Assignee: Globalstar L.P., San Jose, Calif.

[*] Notice: This patent is subject to a terminal disclaimer.

[21] Appl. No.: 08/819,310

[22] Filed: Mar. 18, 1997

[51] Int. Cl.$^6$ ...................................................... H04Q 7/22

[52] U.S. Cl. ...................... 455/13.1; 455/405; 370/93.1; 370/320

[58] Field of Search ................................ 455/12.1, 13.1, 455/405; 370/93, 320

[56] References Cited

U.S. PATENT DOCUMENTS

| | | | |
|---|---|---|---|
| Re. 32,905 | 4/1989 | Baran | 370/104 |
| 4,672,655 | 6/1987 | Koch | 379/57 |
| 4,901,307 | 2/1990 | Gilhousen et al. | 370/18 |
| 5,010,317 | 4/1991 | Schwendeman et al. | 340/311.1 |
| 5,073,900 | 12/1991 | Mallinckrodt | 375/1 |
| 5,081,703 | 1/1992 | Lee | 455/13 |
| 5,109,390 | 4/1992 | Gilhousen et al. | 375/1 |
| 5,119,225 | 6/1992 | Grant et al. | 359/172 |
| 5,216,427 | 6/1993 | Yan et al. | 342/352 |
| 5,233,626 | 8/1993 | Ames | 375/1 |
| 5,239,671 | 8/1993 | Linguist et al. | 455/13.1 |
| 5,265,119 | 11/1993 | Gilhousen et al. | 375/1 |
| 5,303,286 | 4/1994 | Wiedeman | 379/59 |
| 5,339,330 | 8/1994 | Mallinckrodt | 375/1 |

(List continued on next page.)

FOREIGN PATENT DOCUMENTS

| | | |
|---|---|---|
| 0 421 698 A2 | 10/1991 | European Pat. Off. . |
| WO 90/13186 | 11/1990 | WIPO . |
| WO 91/09473 | 6/1991 | WIPO . |
| WO 93/09613 | 5/1993 | WIPO . |

OTHER PUBLICATIONS

"An Integrated Satellite–Cellular Land Mobile System for Europe", E. Del Re, University of Florence, Dept. of Electronics Engineering, italy, Sep. 21, 1989.

"Current and Future Mobile Satellite Communication Systems", S. Kato et al., IEICE Transactions, vol. E 74, No. 8 Aug. 1991, pp. 2201–2210.

"Digital Network Oriented Mobile Radio Satellite System as an Integrated Part of The GSM Cellular Radio System in Europe", P. Dondl, Deutsch Bündespost/Fernmeldetechniches Zentralmt/Darmstadt, Fed. Rep. Germ. Sep. 21, 1989.

(List continued on next page.)

Primary Examiner—William Cumming
Attorney, Agent, or Firm—Perman & Green, LLP

[57] ABSTRACT

A satellite communications system (10) includes at least one satellite (12); a system controller (38); a plurality of gateways (18); and at least one user terminal (13) operable for bidirectionally communicating with at least one of the gateways through the at least one satellite. Individual ones of the plurality of gateways are bidirectionally coupled to at least one terrestrial communications system (4) and act to couple the user terminal to the terrestrial communication system through at least one satellite. In accordance with an aspect of this invention, individual ones of the plurality of gateways are operable for receiving an access request from the user terminal, through at least one satellite, and are further operable for notifying the requesting user terminal, through at least one satellite, that the user terminal is one of accepted by the gateway for establishing a communication link and not accepted by the gateway for establishing the communication link. A gateway that does not accept a user terminal can indicate to the user terminal, based at least in part on a determined location of the user terminal, an identification of a gateway to which the user terminal should apply for access or log-in purposes. The system further includes a data network (39) that interconnects the system controller and the plurality of gateways. The data network may be conveyed by and embodied in one of a wired network, a wireless network, and a combination of a wired network and a wireless network.

9 Claims, 10 Drawing Sheets

U.S. PATENT DOCUMENTS

| | | | |
|---|---|---|---|
| 5,410,728 | 4/1995 | Bertiger et al. | 455/13.1 |
| 5,415,368 | 5/1995 | Horstein et al. | 244/158 R |
| 5,422,647 | 6/1995 | Hirshfield et al. | 342/354 |
| 5,433,726 | 7/1995 | Horstein et al. | 244/158 R |
| 5,439,190 | 8/1995 | Horstein et al. | 244/158 |
| 5,446,756 | 8/1995 | Mallinckrodt | 375/200 |
| 5,448,623 | 9/1995 | Wiedeman et al. | 379/59 |
| 5,452,471 | 9/1995 | Leopold et al. | 455/12.1 |
| 5,551,624 | 9/1996 | Horstein et al. | 244/158 R |
| 5,590,395 | 12/1996 | Diekelman | 455/13.1 |
| 5,596,624 | 1/1997 | Armbruster et al. | 379/58 |
| 5,610,974 | 3/1997 | Lantto | 379/59 |

OTHER PUBLICATIONS

"The OmniTracs Mobile Satellite Communications and Positioning System", E. Tiedemann, Jr. et al., Vehicle Electronics in the 90's: Proceedings of the In'l. Congress on Transporation Electronics, Oct. 1990.

"Software Implementation of a PN Spread Spectrum Receiver to Accommodate Dynamics", C. Cahn et al., IEEE Trans. on Comm., vol. COM–25, No. 8, Aug. 1977.

"A Communication Technique for Multipath Channels", R. Price, Proceedings of the IR, Mar. 1958, pp. 555–570.

Petition of American Mobile Satellite Corporation Before the FCC, Washington, DC 20554, dated Jun. 3, 1991, pp. 1–15.

Application of Motorola Satellite Communication, Inc. for IRIDIUM A Low Earth Orbit Mobile Satellite System before the FCC, Washington, D.C. Dec. 1990, pp. 49–96.

Before the FCC, Washington, D.C. 20554, Aries Constellation Low Earth Orbit Satellite System Proposal of Constellation Communication, Inc. Jun. 3, 1991, Appendix A, B, and C.

Application of TRW Inc. for Authority to Construct a New Communication Satellite System Odyssey before the FCC, Washington, D.C. 20554, May 31, 1991 pp. 33–51.

Application of Ellipsat Corporation Ellipsat for the Authority to Construct Ellipso I An Elliptical Orbit Satellite System, before the FCC, Washington, D.C. 20554, Nov. 2, 1990, pp. 5–34.

Application of Loral Cellular Systems, Corp., Globalstar Mobile COmmunications Wherever You Are, before the FCC, Washington, D.C. Jun. 3, 1991, pp. 94–187.

"Increased Capacity Using CDMA for Mobile Satellite Communication", K. Gilhousen et al., IEEE Journal on Selected Areas in Communication, vol. 8, No. 4, May 1990, pp. 503–514.

"The Iridium System—A Revolutionary Satellite Communications System Developed with Innovative Applications of Technology", D. Sterling et al., IEEE, MILCOM 1991, Nov. 4–7.

"Iridium: Key to Worldwide Cellular Communications", J. Foley, Telecommunications, Oct 1991, pp. 23–28.

SATELLITE COMMUNICATIONS SYSTEM HAVING DISTRIBUTED USER ASSIGNMENT AND RESOURCE ASSIGNMENT WITH TERRESTRIAL GATEWAYS

FIELD OF THE INVENTION

This invention relates generally to satellite communications systems and, in particular, to resource assignment techniques for satellite communication systems.

BACKGROUND OF THE INVENTION

Commonly assigned U.S. Pat. No. 5,448,623, issued Sep. 5, 1995, entitled "Satellite Telecommunications System Using Network Coordinating Gateways Operative with a Terrestrial Communication System", by R. A. Wiedeman and P. A. Monte, describes a wireless telephone system capable of servicing a roaming wireless telephone user. The system includes a satellite communications system having at least one and preferably a constellation of orbiting satellites; at least one terrestrial-based gateway having access to a database of users; at least one network coordinating gateway within at least one satellite service area; a single network control center; and a plurality of terrestrial communications links. A terrestrial data network links together the terrestrial-based components of the system, and is used for communicating, by example, system control and status information amongst the terrestrial-based components.

The system operates by effecting communication between a terrestrial wireless telephone end user transceiver and a terrestrial communications link via a relay through a single satellite or a succession of single relay satellites. The relay satellite may be in motion relative to the end user transceiver and the terrestrial communications link. The terrestrial-based gateway cooperates with the network database to effect hand-off from a first orbiting satellite to a second orbiting satellite. The satellites orbiting near the earth need only translate signals from the gateways and from the users to the gateways, without satellite-based control. That is, the satellites function to receive a ground-originated transmission from a gateway of a user transceiver, frequency translate the received transmission, and transmit to the frequency translated transmission back to the ground.

OBJECT OF THE INVENTION

It is an object of this invention to provide improvements to the satellite-based communications system that is described in U.S. Pat. No. 5,448,623.

SUMMARY OF THE INVENTION

The foregoing and other problems are overcome and the object of the invention are realized by a satellite communications system having at least one satellite; a system controller; a plurality of gateways; and at least one user terminal operable for bidirectionally communicating with at least one of the gateways through at least one satellite. Individual ones of the plurality of gateways are bidirectionally coupled to at least one terrestrial communications system and act to couple the user terminal to the terrestrial communication system through at least one satellite.

In accordance with an aspect of this invention, individual ones of the plurality of gateways are operable for receiving an access request from the user terminal, through at least one satellite, and are further operable for notifying the requesting user terminal, through at least one satellite, that the user terminal is one of accepted by the gateway for establishing a communication link or not accepted by the gateway for establishing the communication link.

In accordance with a further aspect of this invention, individual ones of the plurality of gateways are bidirectionally coupled to a database indicating the identities of active, logged-in user terminals. The gateways are operable for receiving a log-in request from a user terminal, through at least one satellite, and are further operable for notifying the requesting user terminal, through at least one satellite, of one of: (a) that the user terminal's log-in request has been accepted by the gateway for storage in the database; and (b) that the user terminals log-in request has not been accepted by the gateway.

A gateway that does not accept a user terminal can indicate to the user terminal, based at least in part on a determined location of the user terminal, an identification of a gateway or gateways to which the user terminal should apply for access or log-in purposes.

The system further includes a data network that interconnects the system controller and the plurality of gateways. The data network is employed by the system controller and by the gateways for a number of purposes, including selectively assigning system resources to individual ones of the plurality of gateways based at least in part on a predicted demand for system resources. In accordance with a further aspect of this invention, the data network is conveyed by and embodied in one of a wireless network and a combination of a wired network and a wireless network. For example, all or a portion of the data network can be embodied within wireless links that are established between gateways, via the at least one communication satellite.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
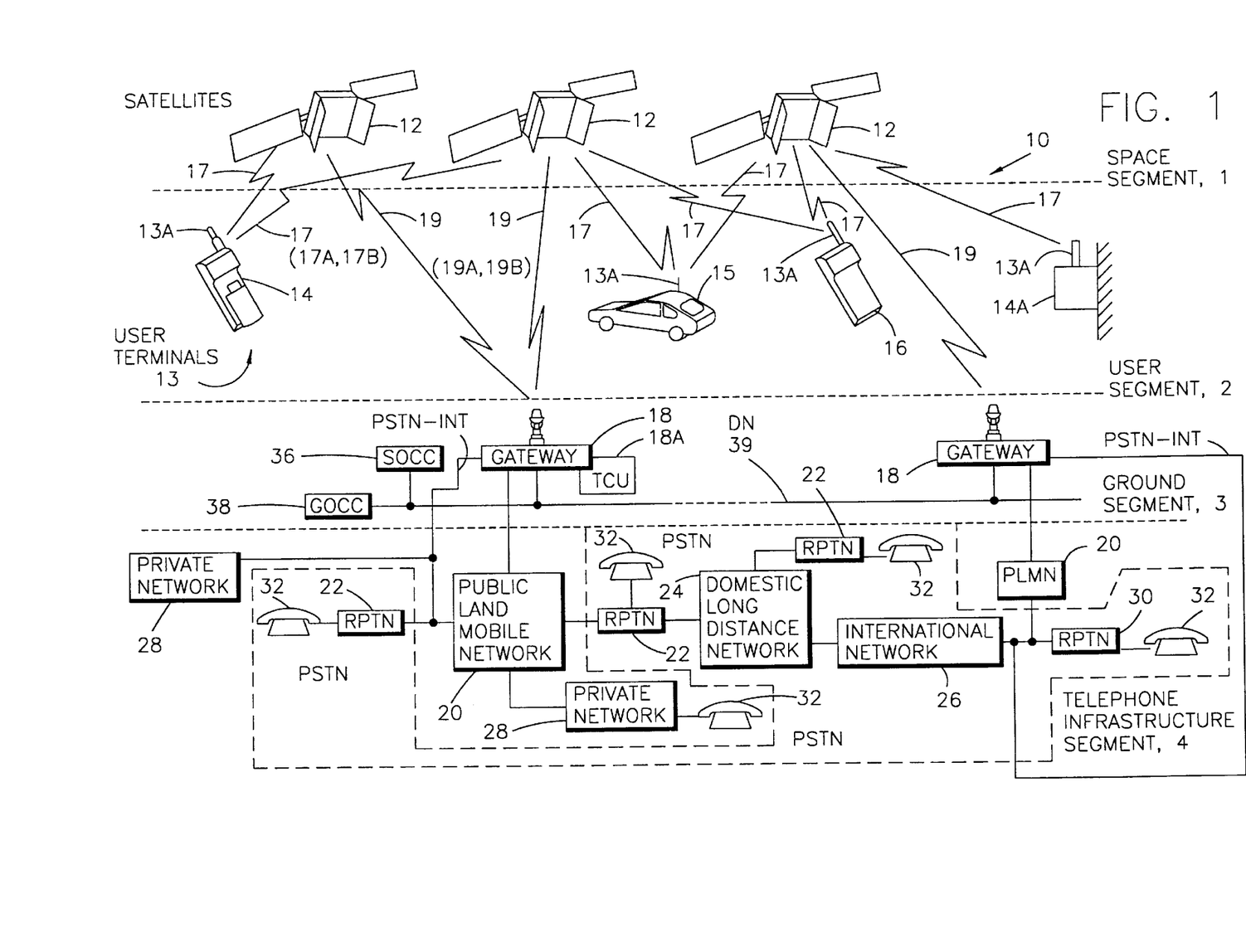
FIG. 1 is block diagram of a satellite communication system that is constructed and operated in accordance with a presently preferred embodiment of this invention.

FIG. 1 illustrates a presently preferred embodiment of a satellite communication system 10 that is suitable for use with the presently preferred embodiment of this invention. Before describing this invention in detail, a description will first be made of the communication system 10 so that a more complete understanding may be had of the present invention.

The communications system 10 may be conceptually subdivided into a plurality of segments 1, 2, 3 and 4. Segment 1 is referred to herein as a space segment, segment 2 as a user segment, segment 3 as a ground (terrestrial) segment, and segment 4 as a telephone system infrastructure segment.

It should be noted that the ground or terrestrial segment 3 is intended to encompass all components that are located anywhere on or adjacent to (including aircraft) the surface of the earth. Any components that are located on or over bodies of water are thus considered to be included within the terrestrial segment.

In the presently preferred embodiment of this invention there are a total of 48 satellites in, by example, a 1414 km Low Earth Orbit (LEO). The satellites 12 are distributed in eight orbital planes with six equally-spaced satellites per plane (Walker constellation). The orbital planes are inclined at 52 degrees with respect to the equator and each satellite completes an orbit once every 114 minutes. This approach provides approximately full-earth coverage with, preferably, at least two satellites in view at any given time from a particular user location between about 70 degree south latitude and about 70 degree north latitude. As such, a user is enabled to communicate to or from nearly any point on the earth's surface within a gateway (GW) 18 coverage area to or from other points on the earth's surface (by way of the PSTN), via one or more gateways 18 and one or more of the satellites 12, possibly also using a portion of the telephone infrastructure segment 4.

It is noted at this point that the foregoing and ensuing description of the system 10 represents but one suitable embodiment of a communication system within which the teaching of this invention may find use. That is, the specific details of the communication system are not to be read or construed in a limiting sense upon the practice of this invention.

Continuing now with a description of the system 10, a soft transfer (handoff) process between satellites 12, and also between individual ones of 16 spot beams transmitted by each satellite (FIG. 3B), provides unbroken communications via a spread spectrum (SS), code division multiple access (CDMA) technique. The presently preferred SS-CDMA technique is similar to the TIA/EIA Interim Standard, "Mobile Station-Base Station Compatibility Standard for Dual-Mode Wideband Spread Spectrum Cellular System" TIA/EIA/IS-95, July 1993, although other spread spectrum and CDMA techniques and protocols can be employed. In general, any multiple access scheme can be employed, such as CDMA, TDMA, FDMA, or a combination of such techniques.

The low earth orbits permit low-powered fixed or mobile user terminals 13 to communicate via the satellites 12, each of which functions, in a presently preferred embodiment of this invention, solely as a "bent pipe" repeater to receive a communications traffic signal (such as speech and/or data) from a user terminal 13 or from a gateway 18, convert the received communications traffic signal to another frequency band, and to then re-transmit the converted signal. That is, no on-board signal processing of a received communications traffic signal occurs, and the satellite 12 does not become aware of any intelligence that a received or transmitted communications traffic signal may be conveying.

Furthermore, there need be no direct communication link or links between the satellites 12. That is, each of the satellites 12 receives a signal only from a transmitter located in the user segment 2 or from a transmitter located in the ground segment 3, and transmits a signal only to a receiver located in the user segment 2 or to a receiver located in the ground segment 3.

The user segment 2 may include a plurality of types of user terminals 13 that are adapted for communication with the satellites 12. The user terminals 13 include, by example, a plurality of different types of fixed and mobile user terminals including, but not limited to, handheld mobile radio-telephones 14, vehicle mounted mobile, radio-telephones 15, paging/messaging-type devices 16, and fixed radio-telephones 14a. The user terminals 13 are preferably provided with omnidirectional antennas 13a for bidirectional communication via one or more of the satellites 12.

It is noted that the fixed radio-telephones 14a may employ a directional antenna. This is advantageous in that it enables a reduction in interference with a consequent increase in the number of users that can be simultaneously serviced with one or more of the satellites 12.

It is further noted that the user terminals 13 may be dual use devices that include circuitry for also communicating with a terrestrial cellular system.

Figure 3A:
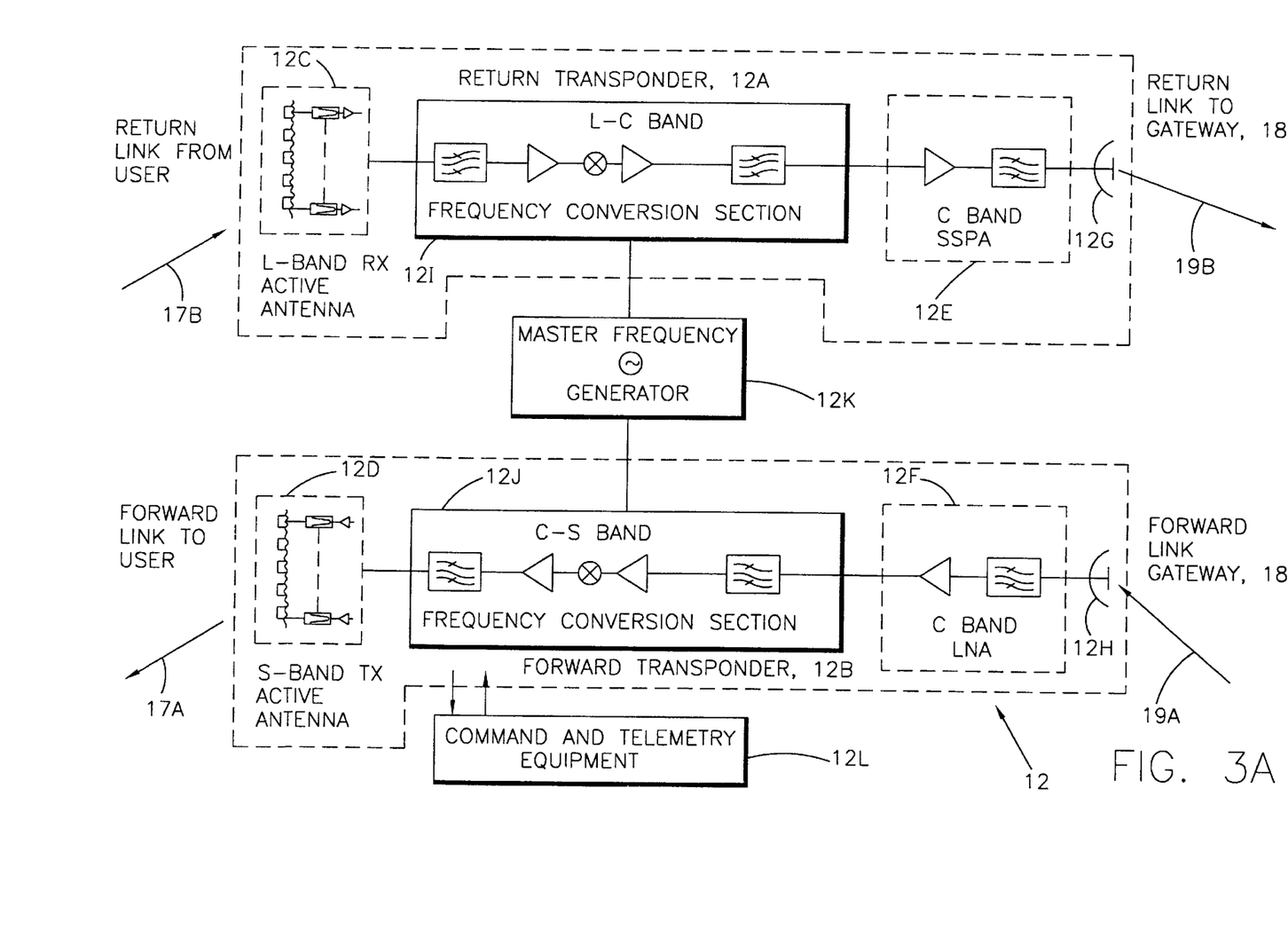
FIG. 3A is a block diagram of the communications payload of one of the satellites of FIG. 1.

Referring also to FIG. 3A, the user terminals 13 may be capable of operating in a full duplex mode and communicate via, by example, L-band RF links (uplink or return link 17b) and S-band RF links (downlink or forward link 17a) through return and forward satellite transponders 12a and 12b, respectively. The return L band RF links 17b may operate within a frequency range of 1.61 GHz to 1.625 GHz, a bandwidth of 16.5 MHz, and are modulated with packetized digital voice signals and/or data signals in accordance with the preferred spread spectrum technique. The forward S band RF links 17a may operate within a frequency range of 2.485 GHz to 2.5 GHz, a bandwidth of 16.5 MHz. The forward RF links 17a are also modulated at a gateway 18 with packetized digital voice signals and/or data signals in accordance with the spread spectrum technique.

The 16.5 MHz bandwidth of the forward link is partitioned into 13 channels with up to, by example, 128 users being assigned per channel. The return link may have various bandwidths, and a given user terminal 13 may or may not be assigned a different channel than the channel assigned on the forward link. However, when operating in the diversity reception mode on the return link (receiving from two or more satellites 12), the user is assigned the same forward channel for each of the satellites and the same or a different channel for the return link.

The ground segment 3 includes at least one but generally a plurality of the gateways 18 that communicate with the satellites 12 via, by example, a full duplex C band RF link 19 (forward link 19a (to the satellite), return link 19b (from the satellite)) that operates within a range of frequencies generally above 3 GHz and preferably in the C-band. The C-band RF links bi-directionally convey the communication feeder links, and also convey satellite commands to the satellites and telemetry information from the satellites. The forward feeder link 19a may operate in the band of 5 GHz to 5.25 GHz, while the return feeder link 19b may operate in the band of 6.875 GHz to 7.075 GHz.

The satellite feeder link antennas 12g and 12h are preferably wide coverage antennas that subtend a maximum earth coverage area as seen from the LEO satellite 12. In the presently preferred embodiment of the communication system 10 the angle subtended from a given LEO satellite 12 (assuming 10° elevation angles from the earth's surface) is approximately 107°. This yields a coverage zone that is approximately 3600 miles in diameter.

Figure 3B:
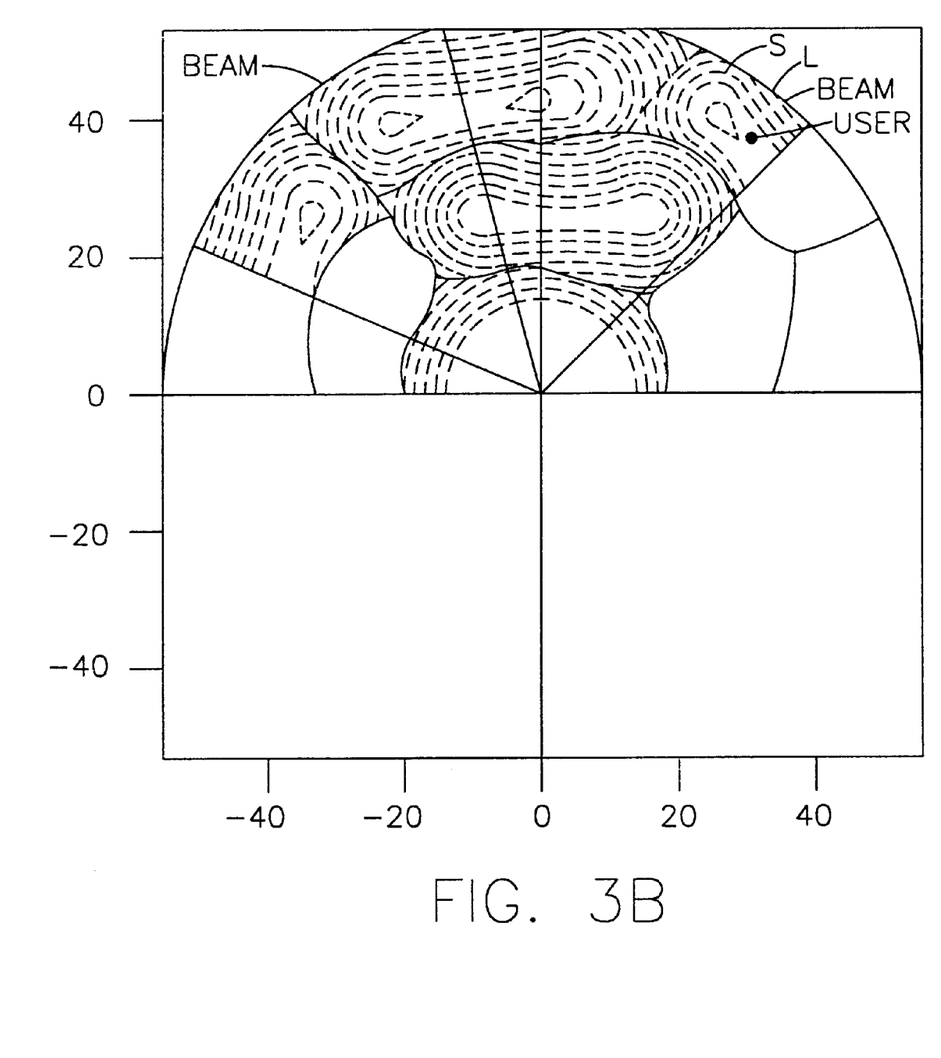
FIG. 3B illustrates a portion of a beam pattern that is associated with one of the satellites of FIG. 1.

The L-band and the S-band antennas are multiple beam antennas that provide coverage within an associated terrestrial service region. The L-band and S-band antennas 12d and 12c, respectively, are preferably congruent with one another, as depicted in FIG. 3B. That is, the transmit and receive beams from the spacecraft cover the same area on the earth's surface, although this feature is not critical to the operation of the system 10.

As an example, several thousand full duplex communications may occur through a given one of the satellites 12. In accordance with a feature of the system 10, two or more satellites 12 may each convey the same communication between a given user terminal 13 and one of the gateways 18. This mode of operation, as described in detail below, thus provides for diversity combining at the respective receivers, leading to an increased resistance to fading and facilitating the implementation of a soft handoff procedure.

It is pointed out that all of the frequencies, bandwidths and the like that are described herein are representative of but one particular system. Other frequencies and bands of frequencies may be used with no change in the principles being discussed. As but one example, the feeder links between the gateways and the satellites may use frequencies in a band other than the C-band (approximately 3 GHz to approximately 7 GHz), for example the Ku band (approximately 10 GHz to approximately 15 GHz) or the Ka band (above approximately 15 GHz).

The gateways 18 function to couple the communications payload or transponders 12a and 12b (FIG. 3A) of the satellites 12 to the telephone infrastructure segment 4. The transponders 12a and 12b include an L-band receive antenna 12c, S-band transmit antenna 12d, C-band power amplifier 12e, C-band low noise amplifier 12f, C-band antennas 12g and 12h, L band to C band frequency conversion section 12i, and C band to S band frequency conversion section 12j. The satellite 12 also includes a master frequency generator 12k and command and telemetry equipment 12l.

Reference in this regard may also be had to U.S. Pat. No. 5,422,647, by E. Hirshfield and C. A. Tsao, entitled "Mobile Communications Satellite Payload", which discloses one type of communications satellite payload that is suitable for use with the teaching of this invention.

The telephone infrastructure segment 4 is comprised of existing telephone systems and includes Public Land Mobile Network (PIMN) gateways 20, local telephone exchanges such as regional public telephone networks (RPTN) 22 or other local telephone service providers, domestic long distance networks 24, international networks 26, private networks 28 and other RPTNs 30. The communication system 10 operates to provide bidirectional voice and/or data communication between the user segment 2 and Public Switched Telephone Network (PSTN) telephones 32 and non-PSTN telephones 32 of the telephone infrastructure segment 4, or other user terminals of various types, which may be private networks.

Also shown in FIG. 1, as a portion of the ground segment 3, is a Satellite Operations Control Center (SOCC) 36, and a Ground Operations Control Center (GOCC) 38. A communication path, which includes a Data Network (DN) 39 (see FIG. 2), is provided for interconnecting the gateways 18 and TCUs 18a, SOCC 36 and GOCC 38 of the ground segment 3. This portion of the communications system 10 provides overall system control functions.

Figure 2:
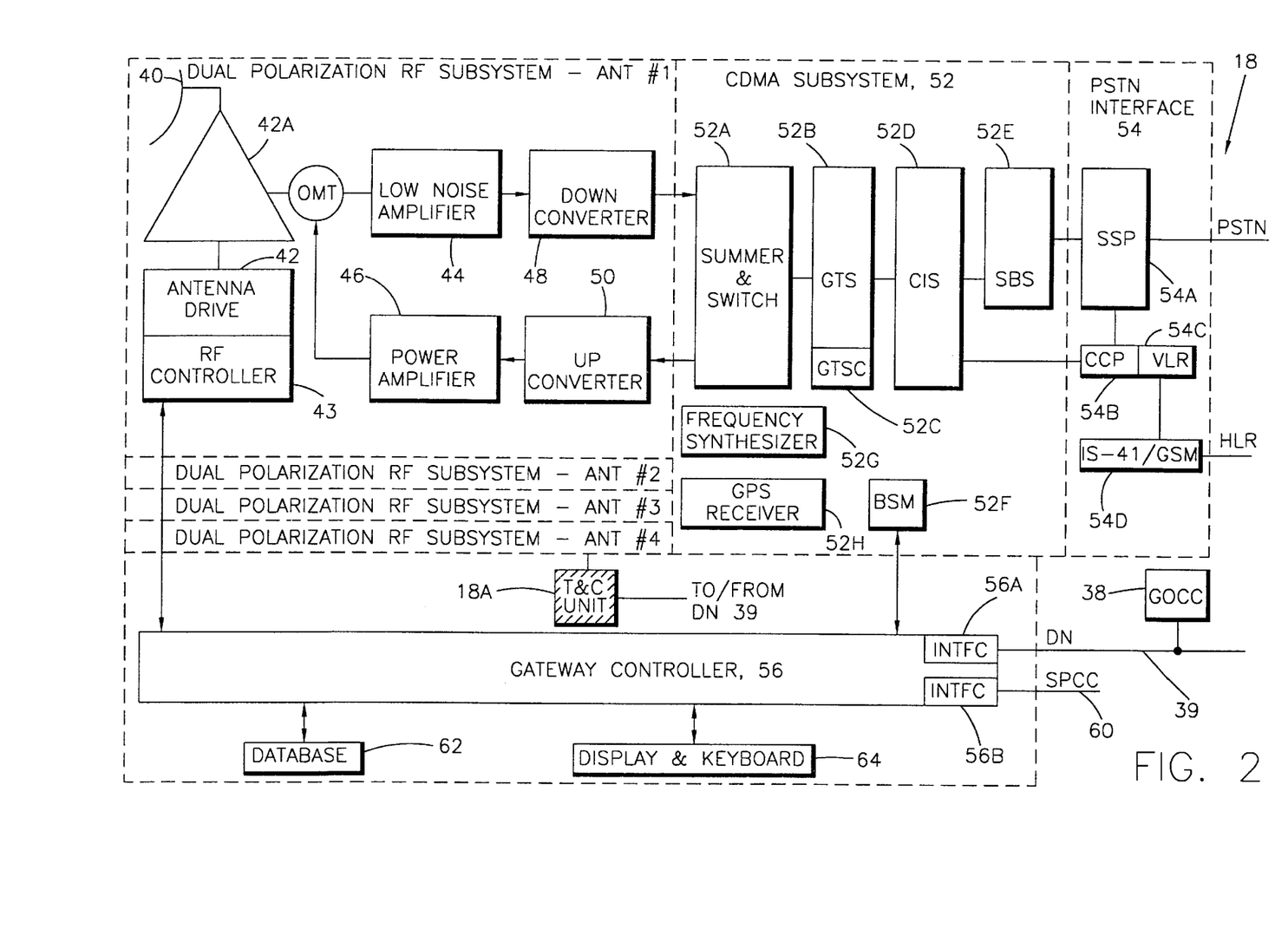
FIG. 2 is a block diagram of one of the gateways of FIG. 1.

FIG. 2 shows one of the gateways 18 in greater detail. Each gateway 18 includes up to four dual polarization RF C-band sub-systems each comprising a dish antenna 40, antenna driver 42 and pedestal 42a, low noise receivers 44, and high power amplifiers 46. All of these components may be located within a radome structure to provide environmental protection.

The gateway 18 further includes down converters 48 and up converters 50 for processing the received and transmitted RF carrier signals, respectively. The down converters 48 and the up converters 50 are connected to a CDMA sub-system 52 which, in turn, is coupled to the Public Switched Telephone Network (PSTN) though a PSTN interface 54. As an option, the PSTN could be bypassed by using satellite-to-satellite links.

The CDMA sub-system 52 includes a signal summer/switch unit 52a, a Gateway Transceiver Subsystem (GTS) 52b, a GTS Controller 52c, a CDMA Interconnect Subsystem (CIS) 52d, and a Selector Bank Subsystem (SBS) 52e. The CDMA sub-system 52 is controlled by a Base Station Manager (BSM) 52f and functions in a manner similar to a CDMA-compatible (for example, an IS-95 compatible) base station. The CDMA sub-system 52 also includes the required frequency synthesizer 52g and a Global Positioning System (GPS) receiver 52h.

The PSTN interface 54 includes a PSTN Service Switch Point (SSP) 54a, a Call Control Processor (CCP) 54b, a Visitor Location Register (VLR) 54c, and a protocol interface 54d to a Home Location Register (HLR). The HLR may be located in the cellular gateway 20 (FIG. 1) or, optionally, in the PSTN interface 54.

The gateway 18 is connected to telecommunication networks through a standard interface made through the SSP 54a. The gateway 18 provides an interface, and connects to the PSTN via Primary Rate Interface (PRI), or other suitable means. The gateway 18 is further capable of providing a direct connection to a Mobile Switching Center (MSC).

The gateway 18 provides SS-7 ISDN fixed signalling to the CCP 54b. On the gateway-side of this interface, the CCP 54b interfaces with the CIS 52d and hence to the CDMA sub-system 52. The CCP 54b provides protocol translation functions for the system Air Interface (AI), which may be similar to the IS-95 Interim Standard for CDMA communications.

Blocks 54c and 54d generally provide an interface between the gateway 18 and an external cellular telephone network that is compatible, for example, with the IS-41 (North American Standard, AMPS) or the GSM (European Standard, MAP) cellular systems and, in particular, to the specified methods for handling roamers, that is, users who place calls outside of their home system. The gateway 18 supports user terminal authentication for system 10/AMPS phones and for system 10/GSM phones. In service areas where there is no existing telecommunications infrastructure, an HLR can be added to the gateway 18 and interfaced with the SS-7 signalling interface.

A user making a call out of the user's normal service area (a roamer) is accommodated by the system 10 if authorized. In that a roamer may be found in any environment, a user may employ the same terminal equipment to make a call from anywhere in the world, and the necessary protocol conversions are made transparently by the gateway 18. The protocol interface 54d is bypassed when not required to convert, by example, GSM to AMPS.

It is within the scope of the teaching of this invention to provide a dedicated, universal interface to the cellular gateways 20, in addition to or in place of the conventional "A" interface specified for GSM mobile switching centers and vendor-proprietary interfaces to IS-41 mobile switching centers. It is further within the scope of this invention to provide an interface directly to the PSTN, as indicated in FIG. 1 as the signal path designated PSTN-INT. It is also within the scope of this invention to provide one or more gateways that are not connected to any cellular system and/or PSTN.

Overall gateway control is provided by the gateway controller 56 which includes an interface 56a to the above-mentioned Data Network (DN) 39 and an interface 56b to a Service Provider Control Center (SPCC) 60. The gateway controller 56 is generally interconnected to the gateway 18 through the BSM 52f and through RF controllers 43 associated with each of the antennas 40. The gateway controller 56 is further coupled to a database 62, such as a database of users, satellite ephemeris data, etc., and to an I/O unit 64 that enables service personnel to gain access to the gateway controller 56. The DN 39 is also bidirectionally interfaced to a Telemetry and Command (T&C) unit 66 (FIG. 1).

The function of the GOCC 38 is to plan and control satellite utilization by the gateways 18, and to coordinate this utilization with the SOCC 36. In general, the GOCC 38 analyses trends, generates traffic plans, allocates satellite 12 and system resources (such as, but not limited to, power and channel allocations), monitors the performance of the overall system 10, and issues system resources utilization instructions, via the DN 39, to the gateways 18 in real time or in advance.

The SOCC 36 operates to maintain and monitor orbits, to relay satellite usage information to the gateway for input to the GOCC 38 via the GDN 39, to monitor the overall functioning of each satellite 12, including the state of the satellite batteries, to set the gain for the RF signal paths within the satellite 12, to ensure optimum satellite orientation with respect to the surface of the earth, in addition to other functions.

As described above, each gateway 18 functions to connect a given user to the PSTN for both signalling, voice and/or data communications and also to generate data, via database 62 (FIG. 2), for billing purposes. Selected gateways 18 include a Telemetry and Command Unit (TCU) 18a for receiving telemetry data that is transmitted by the satellites 12 over the return link 19b and for transmitting commands up to the satellites 12 via the forward link 19a. The DN 39 operates to interconnect the gateways 18, GOCC 38 and the SOCC 36.

Figure 4A:
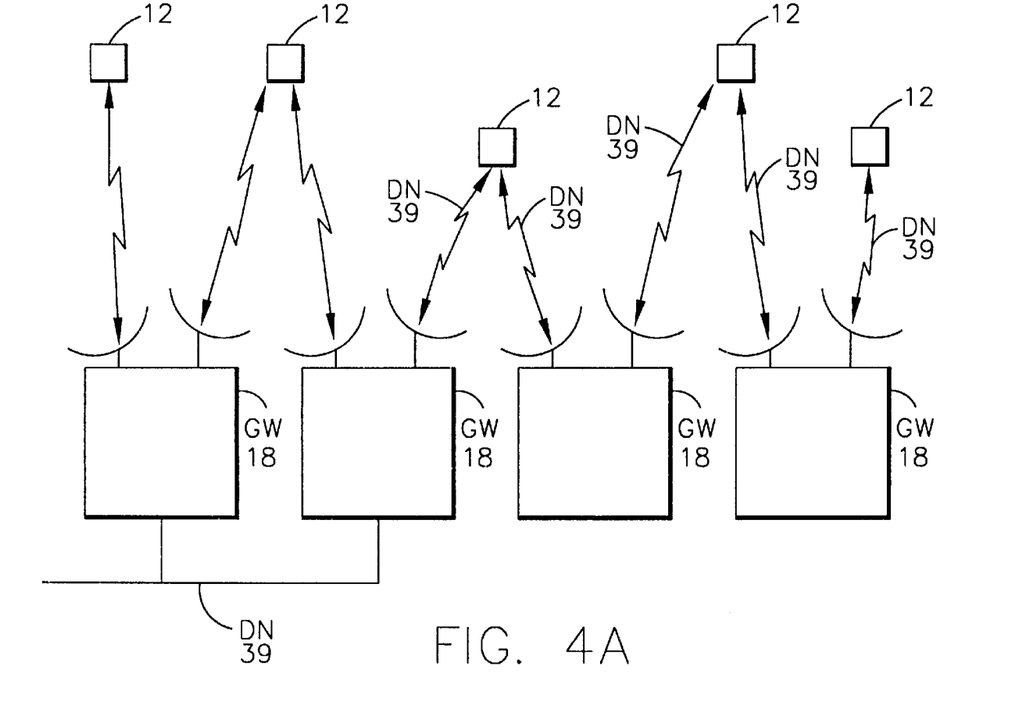
FIG. 4A is a diagram of a first embodiment of a system data network that may be wholly or partially embodied within RF links interconnecting non-geosynchronous satellites and terrestrial gateways.
Figure 4B:
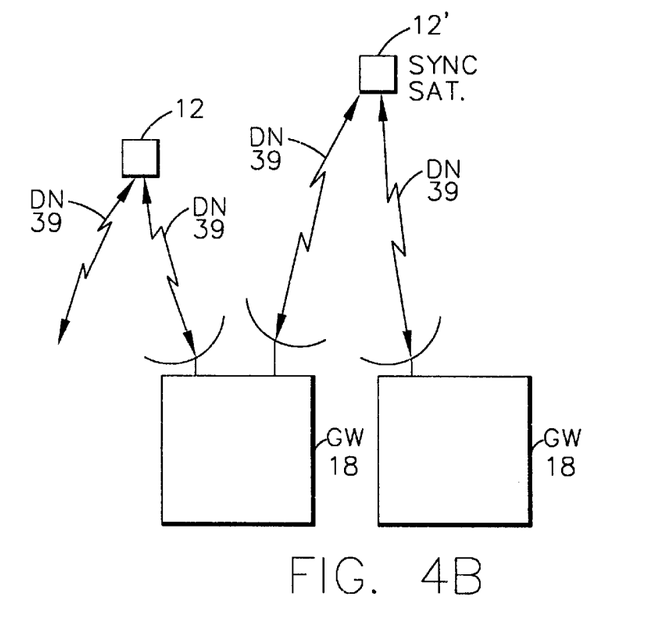
FIG. 4B is a diagram of a second embodiment of a system data network that may be wholly or partially embodied within RF links interconnecting satellites and terrestrial gateways, wherein at least one of the satellites is a geosynchronous satellite.

The DN 39 can be implemented as a terrestrial-only data network using wires and/or optical fiber. It is also within the scope of this invention to implement all or a portion of the DN 39 as a wireless link that interconnects the GWs 18, and also possibly the GOCC 38 and SOCC 36, through the constellation of satellites 12. In this regard reference can be had to FIG. 4A, wherein a plurality of gateways 18 are interconnected through space-based RF links that convey the DN 39 via satellites 12, while others are interconnected via a terrestrial data network. In this case the satellites 12 can include a C-band to C-band transponder or, by example, a C-band (uplink) to S-band (downlink) transponder. For this latter case one or more L-band and S-band traffic channels can be allocated for conveying the DN 39, and the GWs 18 then are provided with suitable L-band and S-band transmitter and receiver circuits and antenna(s), respectively, as may be the GOCC 38 and the SOCC 36. In FIG. 4A the satellites 12 may all be non-geosynchronous orbit satellites, while in FIG. 4B at least one of the satellites 12' can be a geosynchronous orbit satellite.

It should be realized that all of the DN 39 can be implemented using the wireless RF links, or only a portion thereof. It should further be realized that the wireless RF links can be used in conjunction with the terrestrial data links to provide redundancy and fault tolerance. Alternatively, certain types of messages and/or status information can be conveyed through the terrestrial data network, while other types of messages and/or status information can be conveyed through the wireless RF data network. Furthermore, all or a portion of the wireless RF links may employ, by example, ground-based microwave links and repeaters, and need not be routed specifically through the satellites. Also, it is within the scope of this invention to employ one or more satellites other than the constellation of communication satellites 12 for conveying the DN 39. By example, and as was shown in FIG. 4B, one or more Medium Earth Orbit and/or geosynchronous satellites can be employed for providing full earth coverage for the DN 39.

In general, each satellite 12 of the LEO constellation operates to relay information from the gateways 18 to the users (C-band forward link 19a to S-band forward link 17a), and to relay information from the users to the gateways 18 (L band return link 17b to C band return link 19b). This information includes SS-CDMA synchronization, paging and access channels, in addition to power control signals. Various CDMA pilot channels may also be used as is described in further detail below. Satellite ephemeris update data is also communicated to each of the user terminals 13, from the gateway 18, via the satellites 12. The satellites 12 also function to relay signalling information from the user terminals 13 to the gateway 18, including access requests, power change requests, and registration requests. The satellites 12 also relay communication signals between the users and the gateways 18, and may apply security to mitigate unauthorized use.

If used, each pilot channel that is transmitted by the gateway 18 may be transmitted at the same power level, a higher power level, or a lower power level than the other signals. There is a pilot channel on each FDMA channel within each beam. All pilots are derived from a common PN seed code synchronized to GPS System Time. Each gateway 18 applies a time offset to create a PN code with a different phase offset. The time offset is used by the user terminal 13 to determine which gateway is transmitting the pilot. The pilot enables a user terminal 13 to acquire the timing of the forward CDMA channel, provides a phase reference for coherent demodulation, and provides a mechanism to perform signal strength comparisons to determine when to initiate handoff. The use of the pilot channel is not, however, mandatory, and other techniques can be employed for this purpose.

In operation, the satellites 12 transmit spacecraft telemetry data that includes measurements of satellite operational status. The telemetry stream from the satellites, the commands from the SOCC 36, and the communications feeder links 19 all share the C band antennas 12g and 12h. For those gateways 18 that include a TCU 18a the received satellite telemetry data may be forwarded immediately to the SOCC 36, or the telemetry data may be stored and subsequently forwarded to the SOCC 36 at a later time, typically upon SOCC request. The telemetry data, whether transmitted immediately or stored and subsequently forwarded, can be sent over the DN 39 as packet messages, each packet message containing a single minor telemetry frame. Should more than one SOCC 36 be providing satellite support, the telemetry data is routed to all of the SOCCs.

The SOCC 36 has several interface functions with the GOCC 38. One interface function is orbit position information, wherein the SOCC 36 provides orbital information to the GOCC 38 such that each gateway 18 can accurately track up to four satellites that may be in view of the gateway. This data includes data tables that are sufficient to allow the gateways 18 to develop their own satellite contact lists, using known algorithms. The SOCC 36 is not required to known the gateway tracking schedules. The TCU 18a searches the downlink telemetry band and uniquely identifies the satellite being tracked by each antenna prior to the propagation of commands.

Another interface function is satellite status information that is reported from the SOCC 36 to the GOCC 38. The satellite status information includes both satellite/transponder availability, battery status and orbital information and incorporates, in general, any satellite-related limitations that would preclude the use of all or a portion of a satellite 12 for communications purposes.

An important aspect of the system 10 is the use of SS-CDMA in conjunction with diversity combining at the gateway receivers and at the user terminal receivers. Diversity combining is employed to mitigate the effects of fading as signals arrive at the user terminals 13 or the gateway 18 from multiple satellites over multiple and different path lengths. Rake receivers in the user terminals 13 and the gateways 18 are employed to receive and combine the signals from multiple sources. As an example, a user terminal 13 or the gateway 18 provides diversity combining for the forward link signals or the return link signals that are simultaneously received from and transmitted through the multiple beams of the satellites 12.

In this regard the disclosure of U.S. Pat. No. 5,233,626, issued Aug. 3, 1993 to Stephen A. Ames and entitled "Repeater Diversity Spread Spectrum Communication System", is incorporated by reference herein in its entirety.

The performance in the continuous diversity reception mode is superior to that of receiving one signal through one satellite repeater, and furthermore there is no break in communications should one link be lost due to shadowing or blockage from trees or other obstructions that have an adverse impact on the received signal.

The multiple, directional, antennas 40 of a given one of the gateways 18 are capable of transmitting the forward link signal (gateway to user terminal) through different beams of one or more satellites 12 to support diversity combining in the user terminals 13. The omnidirectional antennas 13a of the user terminals 13 transmit through all satellite beams that can be "seen" from the user terminal 13.

Each gateway 18 supports a transmitter power control function to address slow fades, and also supports block interleaving to address medium to fast fades. Power control is implemented on both the forward and reverse links. The response time of the power control function is adjusted to accommodate for a worst case 30 msec satellite round trip delay.

A synchronizing (SYNC) channel generates a data stream that includes the following information: (a) time of day; (b) transmitting gateway identification; (c) satellite ephemeris; and (d) assigned paging channel. The paging channel conveys several message types which include: (a) a system parameter message; (b) an access parameter message; and (c) a CDMA channel list message. The system parameter message includes the configuration of the paging channel, registration parameters, and parameters to aid in acquisition. The access parameters message includes the configuration of the access channel and the access channel data rate. The CDMA channel list message conveys, if used, an associated pilot identification and Walsh code assignment. The paging channel also conveys a list of neighboring gateways and their pilot signals, as will be described in greater detail below.

The access channel is employed by the user terminal 13 to communicate with the gateway 18 when the user terminal 13 is not using the traffic channel. The access channel is used for short signaling message exchanges such as call origination, responses to pages, and registration.

From the access channel the gateway 18 receives and decodes a burst from a user terminal 13 that requests access. The access channel message is embodied in a long preamble followed by a relatively small amount of data. The preamble is the user terminal's long PN code. Each user terminal 13 has a unique long PN code generated by an offset into the common PN generator polynomial.

After receiving the access request, the gateway 18 sends a message on the forward link paging channel acknowledging receipt of the access request and assigning a Walsh code and a frequency channel to the user terminal 13 to establish a traffic channel. Both the user terminal 13 and the gateway 18 switch to the assigned channel element and begin duplex communications using the assigned Walsh (spreading) code (s).

The return traffic channel is generated in the user terminal 13 by convolutionally encoding the digital data from the local data source or the user terminal vocoder. The data is then block interleaved at predetermined intervals and is applied to a 64-Ary modulator and a data burst randomizer to reduce correlation, and thus interference, between return traffic channels. The data is then added to the zero offset PN code and transmitted through one or more of the satellites 12 to the gateway 18.

The gateway 18 processes the return link by using, by example, a Fast Hadamard Transform (FHT) to demodulate the 64-Ary Walsh Code and provide the demodulated information to the diversity combiner.

The foregoing has been a description of a presently preferred embodiment of the communication system 10. A description is now made of presently preferred embodiments of this invention.

In a currently preferred embodiment the user terminals 13 are capable of registering with and receiving service from only the satellite system (single mode), or from the satellite system or a terrestrial system (multi-mode). In this latter case one system may be preferred over the other for a first registration attempt. If unsuccessful in obtaining service from the preferred system, the other system can be automatically tried. Reference in this regard can be had to commonly assigned U.S. patent application Ser. No. 08/707, 534, filed Sep. 4, 1996, entitled "Automatic Satellite/Terrestrial Mobile Terminal Roaming System and Method", by R. A. Wiedeman and M. J. Sites, incorporated by reference herein in its entirety.

As was indicated previously, the pilot signal is an unmodulated direct sequence spread spectrum signal. The pilot allows the user terminal 13 to acquire the timing of the forward CDMA channel, thereby providing a phase reference for coherent demodulation while also providing a means for signal strength comparison to determine when to initiate a handoff. Multiple pilots are transmitted by each gateway 18, one in each FDMA channel.

Figure 5:
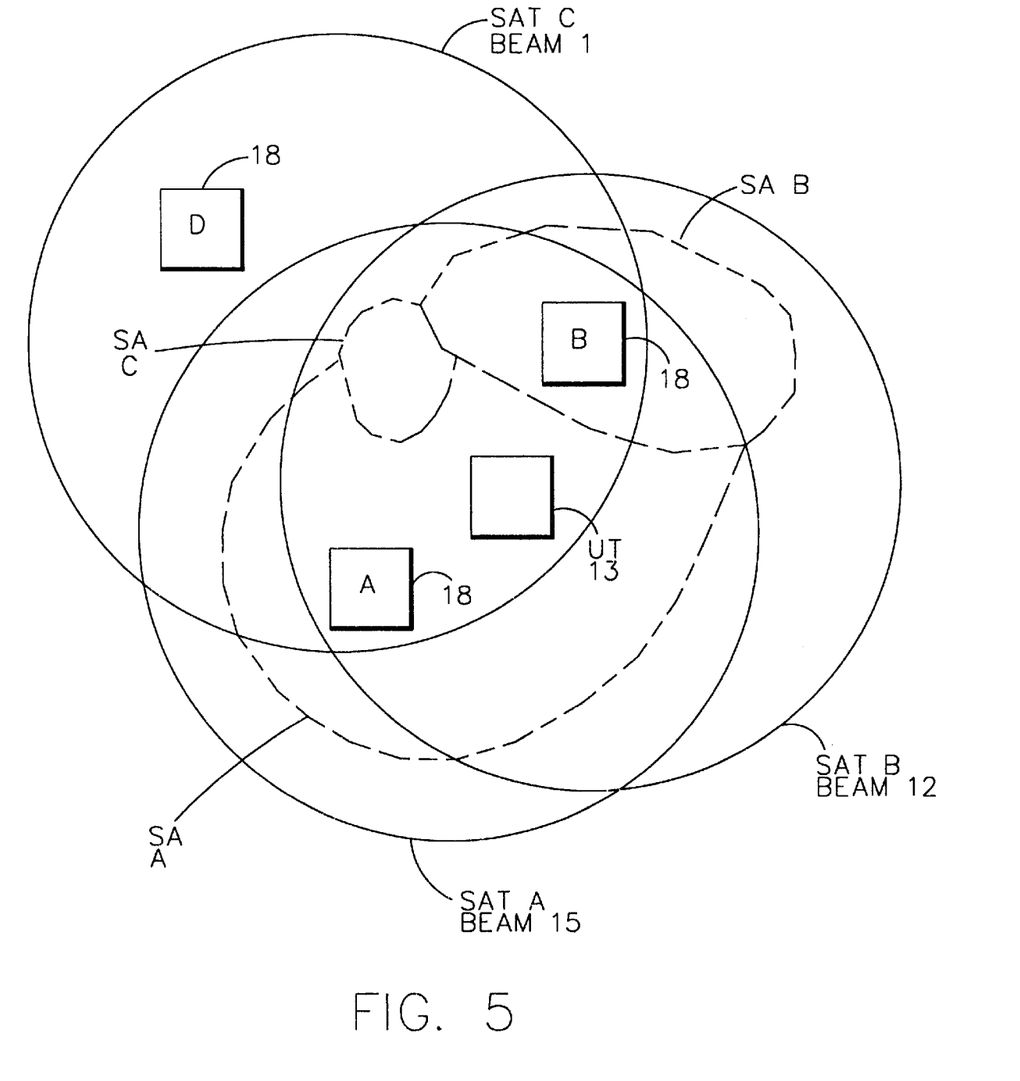
FIG. 5 illustrates a user terminal, three service areas, beams from three satellites, and three gateways, and is useful in explaining a method of this invention.

FIG. 5 illustrates three exemplary service areas (SAs) labeled A, B and C. Service area A includes a GW-A 18 that serves SA A and SA C, while SA B is served by a GW-B 18. Also illustrated are three beams associated with satellites A, B and C, specifically outer beams 15 and 12 of satellites A and B, respectively, and inner beam 1 of satellite C. A GW-D 18 is located outside the service areas SA-A, SA-B and SA-C, but within the beam 1 of satellite C. A user terminal 13 is located within SA-A and is within all of the spot beams 15, 12 and 1 of satellites A, B and C, respectively.

It is assumed that the user terminal 13 intends to access the system 10 from an initially unpowered condition. Referring to the logic flow diagram of FIGS. 6A and 6B, the following steps are executed by the user terminal 13 in cooperation with the gateway controller 56 of FIG. 2.

Figure 6A:
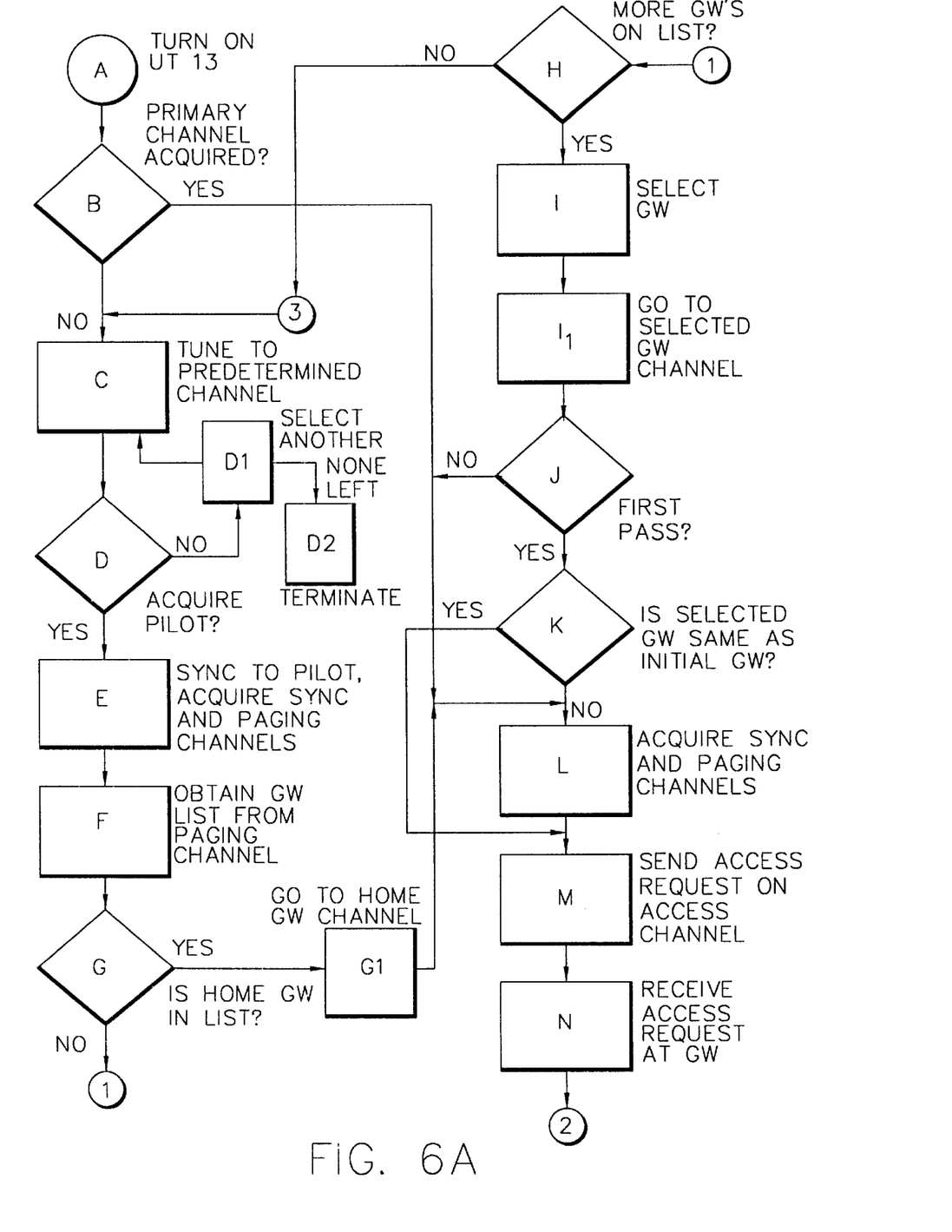
FIGS. 6A and 6B are a flow chart that illustrates a first method of this invention.

At Block A the user terminal (UT) 13 is turned on (a cold start condition). The UT 13 accesses a previously stored indication of a gateway number, such as the last-used gateway, and the primary FDMA channel number for the gateway. In many cases this gateway will be UT's home gateway. At Block B the UT 13 tunes to the channel and attempts to acquire the pilot for the primary FDMA channel. By example, the pilot may be carrier signal used by the UT 13 to obtain initial system synchronization and to provide time, frequency, and phase tracking. Different pilots can be transmitted with the same code, but with different code offsets, enabling then to be distinguished. If the UT 13 is successful in acquiring the primary FDMA channel, control passes to Block L, as described below. If the UT 13 is unsuccessful in acquiring the primary FDMA channel (and gateway) control passes to Block C where the UT 13 accesses a stored list of channels and tunes to a predetermined channel (e.g., channel 7 of, for example, 13 channels) that is specified as a primary channel.

By example, if the test at Block B fails, the UT 13 may have been carried across the country, or to another country, since the time it was last used. In this case the UT 13 may not find its home gateway 18 when it attempts to access the system 10.

At Block D the UT 13 attempts to acquire the pilot in the channel from the predetermined channel list. If the UT 13 is not successful, control passes to Block D1 to select another channel from the list, and then back to Block C. If the channel list has been exhausted without gaining access to a gateway, control passes to Block D2 where the initial system acquisition procedure is terminated.

Assuming that the UT 13 is successful in acquiring a pilot in a channel from the predetermined channel list at Block D, the UT 13 synchronizes to the pilot, then in turn accesses the sync channel to gain access to a satellite database and other information. This database facilitates the rapid acquisition of the pilot for future calls. The UT 13 than accesses the paging channel (Block E). The operation acquiring these channels may be collectively referred to as receiving a reference signal. From the paging channel the UT 13 can obtain the list of gateways and their respective pilot offsets (Block F). At Block G the UT 13 determines if the UT'S home gateway is in the list of gateways. If the UT's home gateway is in the gateway list, the UT 13 goes to the channel specified for the home gateway and acquires the pilot in that channel, and control passes to Block L, as will be described below, so that the UT 13 can access the home gateway. If the UT's home gateway is not in the list of gateways control passes to Blocks H, I and $I_1$ where a gateway is selected (if one is available on the gateway list) and an attempt is made to acquire the selected gateway. If there are no further gateways on the list at Block H, control passes back to Block C.

Referring again to FIG. 5, the selected gateway 18 may not serve the area in which the user terminal 13 is located. By example, the UT 13 is shown as being located within the SA-A, and should be assigned to the gateway A. However, the UT 13 may be receiving the pilot signal in a particular channel of the gateway D through the inner beam 1 of satellite C. Although the UT 13 have also be receiving pilots from gateways A and B, the gateway D is selected because of the higher signal strength of its pilot signal, or because the gateway's pilot signal is the first that the user terminal 13 was able to acquire, or the gateway may be selected based on some other criterion.

Figure 6B:
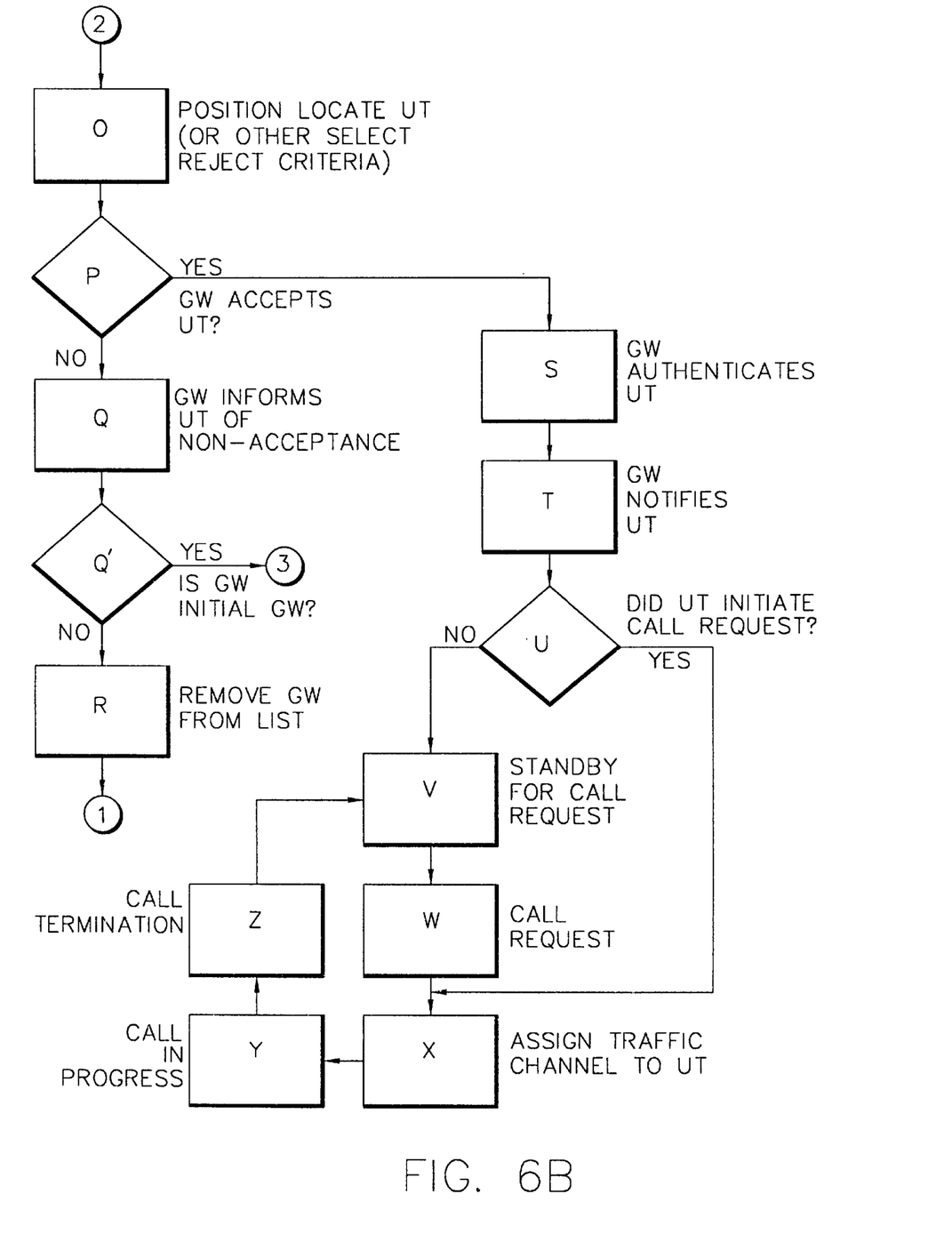

Assuming that this is the first pass through the acquisition procedure, control passes through Block J to Block K to determine if the selected gateway is also the initial gateway that was acquired at Blocks D and E. If yes, control passes to Block M where the UT 13 sends an access request on the specified access channel. If the selected gateway is not the initially selected gateway at Block K, then control passes instead to Block L where the UT 13 acquires the sync and paging channels of the selected gateway, and thus determines the access channel parameters. Control then passes to Block M to send an access request on the access channel to the selected gateway. The access request may be, by example, a request to log-in the UT 13 into the database of active users, or may be a request to initiate a call, or may be both. A call can be made either to one of the terrestrial telecommunications systems that are connected to the gateway 18, such as the PSTN or a private network, or to another user terminal 13 within the service area of the gateway 18, or to any other device that the UT 13 designates.

At Block N the selected gateway, for example the gateway D of FIG. 5, receives the access request from the UT 13. In this embodiment of the invention the selected gateway 18 performs a position location on the UT 13 using any of various position determining techniques such as multilateral time measurements, reception of UT 13 GPS information, or other means. At Block P the selected gateway 18 makes a determination, based at least in part on the position location, whether to accept or reject the UT 13. Other accept/reject criteria can also be used (e.g., whether or not a roaming agreement exists with the service provider of the user's home gateway). If the UT 13 is accepted, control passes to Block S where the UT 13 is authenticated and, assuming that the UT 13 is authenticated, the UT 13 is added to gateway's VLR 54c (FIG. 2) as an active user at this gateway. Control passes to Block T where the gateway notifies the UT 13 of acceptance and, if a call request was sent, begins call setup. At Block U the gateway determines if the UT 13 has initiated a call request. If No, control passes to Block V to enter a standby state waiting for a call request. At Block W the call request is received, and at Block X the gateway 18 assigns one or more traffic channels to the UT 13. The call is initiated and is in progress at Block Y. At Block Z the call terminates, and control passes back to Block V for the gateway 18 to wait for the next call request. If the determination at Block U is Yes, then control passes immediately to Block X to assign the one or more traffic channels to the UT 13.

Referring again to FIG. 5, and assuming for this example that the UT 13 sends an access request to the gateway D, the gateway D determines from the determined location of the UT that the UT is in the SA-A, and that the UT 13 should be assigned to the gateway A. If the UT 13 had instead been determined to be in the SA-C, the UT 13 would still be assigned to the gateway A, which is assumed for this example to also be servicing the SA-C. If instead the UT 13 were to be determined to be located within the SA-B, then the UT 13 would be assigned to the gateway B.

Assuming that the gateway D determines at Block P that the UT 13 is not to be accepted, the gateway D (at Block Q) informs the UT 13 through the forward link, on the paging channel, that the UT 13 is not accepted. The non-acceptance message can also include an identification of a gateway to which the UT 13 should next apply for acceptance, as described above. It is also within the scope of this invention for the gateway D to simply not respond to the access request by the UT 13 which, after a predetermined timeout period, will be informed by default that the UT 13 has not been accepted by the gateway D. The UT 13 after some predetermined period of time will attempt another gateway.

As a result of not being accepted by the gateway D, the UT 13 determines if the gateway that indicated non-acceptance was the initial gateway (i.e., at Block B the Yes path was taken). If Yes, control then passes to Block C. If No, control passes to Block R where the UT 13 removes the previously selected gateway from the list of gateways determined at Block F, and control returns to Block H to select a next gateway from the list. The next gateway can be the gateway having, by example, the next strongest pilot signal. Alternatively, and if the gateway D included a gateway identifier in the non-acceptance message, the UT 13 selects the gateway designated in the non-acceptance message. At Block J control now passes to Block L, and an access request is made to the next gateway at Block M, as previously described.

Figure 7:
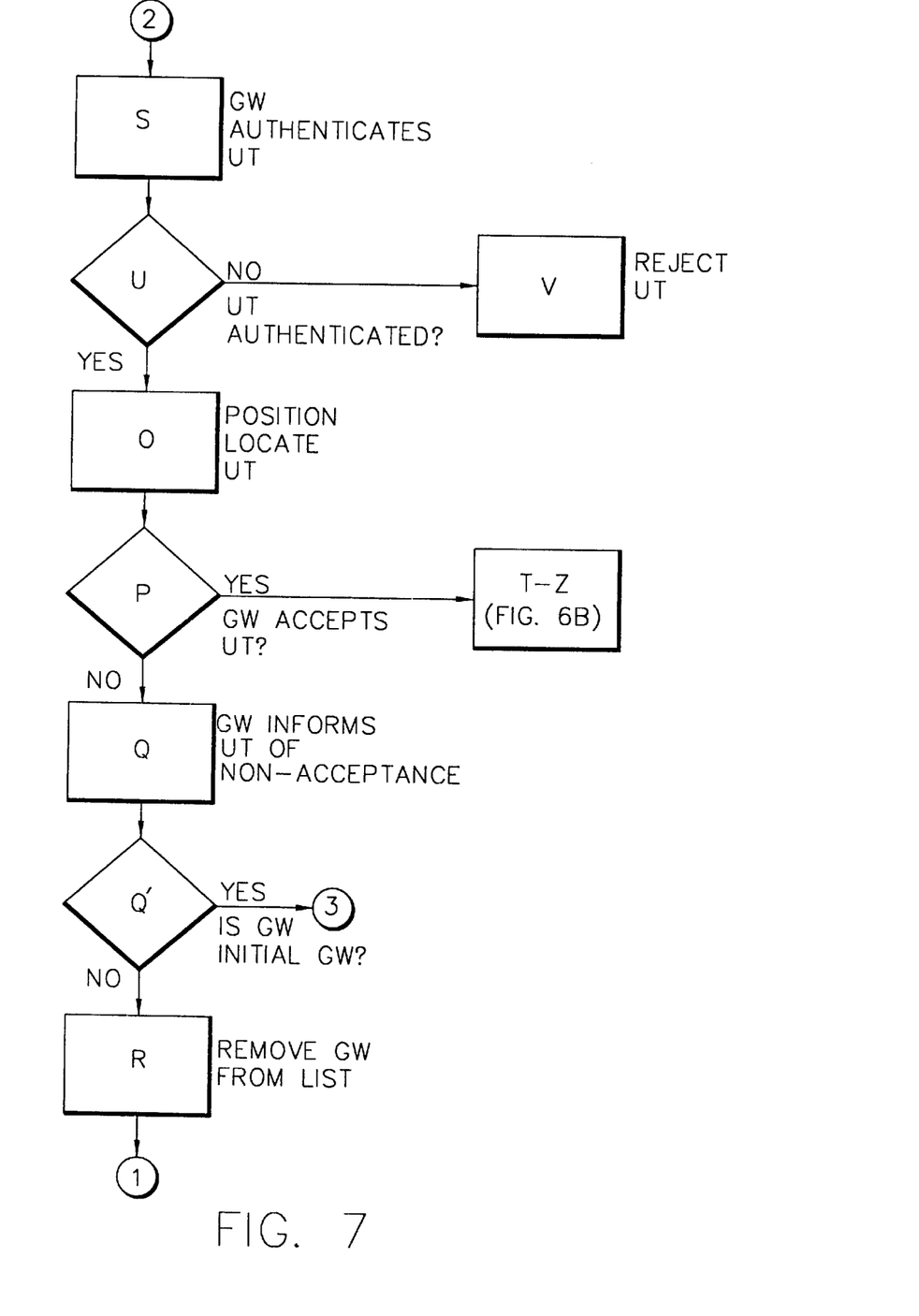
FIG. 7 is a flow chart that illustrates a second method of this invention.

FIG. 7 depicts a further embodiment of this invention, wherein Blocks A-N are as in FIG. 6A. After receiving the access request at Block N, the gateway performs Block S to authenticate the UT 13. At Block U the UT 13 is rejected if not authenticated (Block V). If the UT 13 is authenticated at Block U then Block 0 is executed to perform a position location on the authenticated UT 13. Processing then continues at Block P, as in FIG. 6B, to determine whether to accept or reject the UT's access request.

Figure 8:
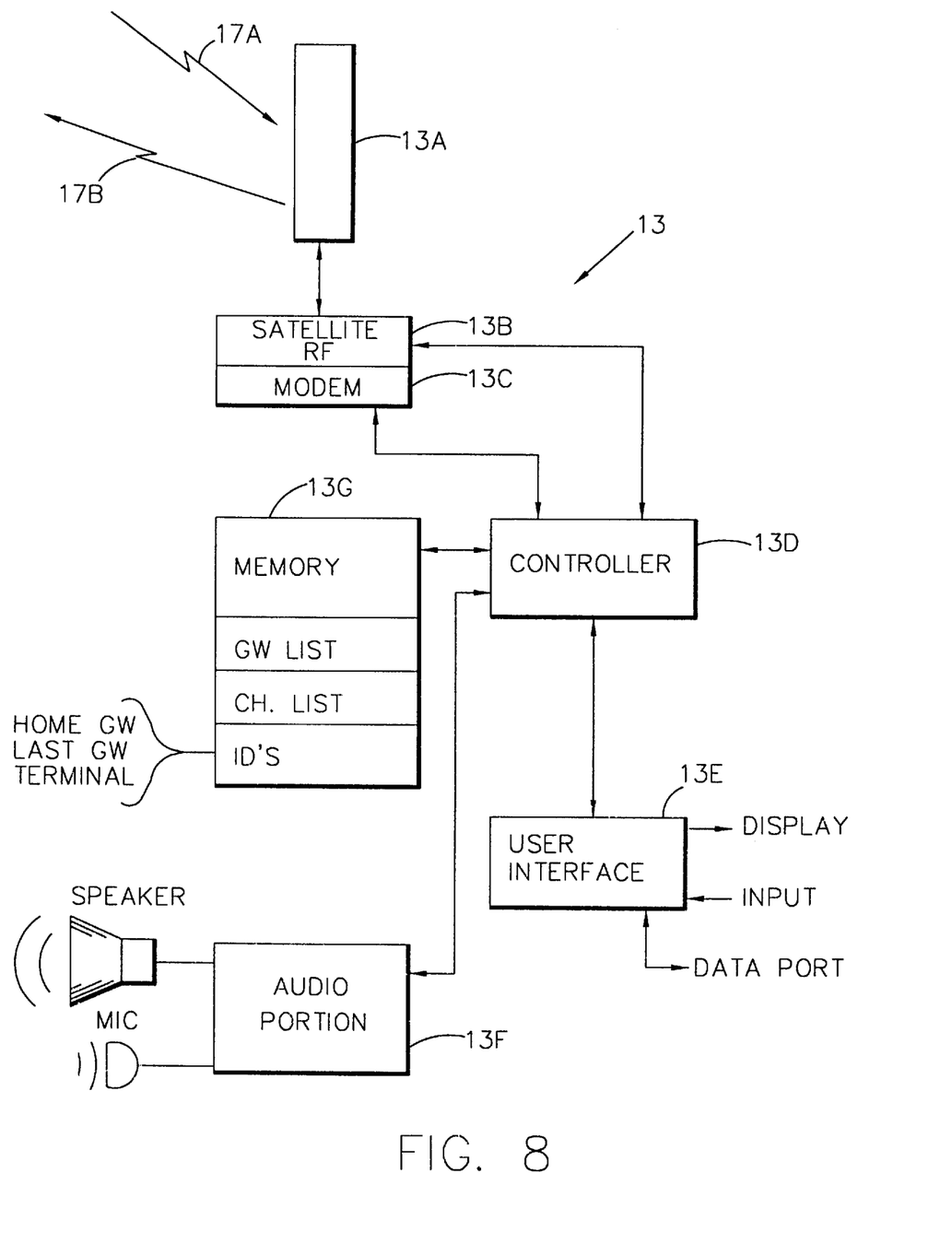
FIG. 8 is a block diagram of a user terminal that is adapted for practicing the teaching of this invention.

Reference is now made to FIG. 8 for showing a block diagram of one of the user terminals 13. Coupled to the antenna 13A (which could be comprised of separate transmit and receive antennas) is a satellite RF section having a tunable receiver and transmitter for receiving the downlink satellite transmissions 17B, on various FD channels selectively, and for transmitting the uplink transmission 17A, on various FD channels selectively. A modulator and demodulator (modem) 13C includes suitable spread spectrum circuitry for modulating and spreading the uplink transmissions and for demodulating and de-spreading the downlink transmissions. A controller 13D controls the overall operation of the user terminal 13 and is connected to the modem 13C, to a user interface 13E, to an audio portion 13F, and to a memory 13G. The user interface 13E is coupled to a display (not shown) and user input device, typically a conventional keypad (not shown). The audio portion 13F includes circuitry for driving a speaker and for receiving and digitizing a signal input from a microphone (mic). The memory 13G stores the terminal identifier (ID) and type (e.g., fixed, handheld, etc.), the last channel information that is used at Block B of FIG. 6A, the gateway list that is obtained at Block F of FIG. 6A, satellite ephemeris data, the identifications of assigned gateways and frequency channels, the assigned spreading code or codes, and any other data and programs required to operate the user terminal 13. A port can also be provided for use in data transmission and reception applications, such as a port that can be connected to a data processor, a facsimile machine, or some other device that sources and/or sinks data.

In accordance with an aspect of this invention, each of the gateways 18 of the system 10 includes a capability to receive and accept an access request from a user terminal 13, and also to receive and reject an access request from a UT 13. If rejecting the access request of the UT 13, the gateway 18 may also provide an indication of another gateway or gateways to which the UT 13 should make a next access request. That is, each of the gateways 18 is capable of taking an active role in the assignment of a UT 13 either to itself or to another gateway. This functionality is preferably implemented in software executed by the gateway controller 56 (FIG. 2), although dedicated circuitry can also be provided for executing this function either in whole or in part.

While described above in the context of exemplary embodiments of this invention, it should be realized that a number of modifications can be made to these embodiments, and that these modifications will fall within the scope of the teaching of this invention. By example, certain of the blocks shown in FIGS. 6A, 6B, and 7 can be executed in other than the order shown, while still obtaining the same result.

Further by example, it should be realized that the gateway 18 can employ a number of different criteria when making a decision as to whether to accept or reject an access request from a given user terminal 13. By example, and in addition to considering the determined location of the user terminal 13, the gateway 18 can also consider one or more of: (a) a current loading of the gateway or a predicted loading of the gateway 18 (as obtained from the GOCC 38 over the DN 39) ; (b) any impairments in the system, such as in one or more beams of the satellites 12 that are in view of the user terminal 13 that is requesting access (which may also be received from the GOCC 38 or the SOCC 36 over the DN 39); (c) the type of user terminal 13 that is requesting access (i.e., the user terminal 13 may also transmit its type (e.g., fixed, handheld, etc.) when transmitting the access request); (d) the existence of a shared gateway which shares a plurality of service areas; and (e) other criteria, such as the presence of a roaming agreement.

Another criterion upon which to base the acceptance or non-acceptance of the UT 13 is a telephone number sent by the UT 13 with a call setup service request which includes authentication data. By example, and referring again to FIG. 5, if the gateway A can determine, from the number that the UT 13 is making a call to, that the number is associated with a private or non-public network that is known from database information to be connected to gateway B (but not gateway A), then gateway A may reject the call request, and provide the UT 13 with a gateway list that includes only gateway B. In a similar manner, if the UT 13 is determined to be calling another UT that is known to be in the service area of gateway B, then gateway A may reject the call request, and provide the UT 13 with a gateway list that includes gateway B.

As such, a method is provided for operating a telecommunications system having at least one earth orbiting satellite for conveying signals between a user terminal and one of a plurality of gateways. The method includes the steps of (a) receiving a service request that is transmitted from the user terminal, the service request being received at a first gateway and indicating a destination telephone number to which a call is to be placed; (b) determining if the first gateway is capable of serving the destination telephone number; and, if not, (c) transmitting a message to the user terminal, the message rejecting the service request and including an indication of another gateway that is capable of serving the destination telephone number. For example, the destination telephone number may correspond to a telephone number of a non-public network, or may correspond to a telephone number of a another user terminal.

Another criterion that is based on the number called is a determination by the gateway as to which gateway can complete the call in a most cost-effective manner. By example, assume the UT 13 is in an area of overlapped gateway service and calls a number in country B, but first accesses a gateway in country A. The gateway in country A examines the called number and determines that the user's call will be less expensive if handled instead by the gateway in country B. In this case the gateway in country A sends a reject message to the UT 13, with an indication to contact the gateway in country B.

As such, a method is provided for operating a telecommunications system having at least one earth orbiting satellite for conveying signals between a user terminal and one of a plurality of gateways. The method includes the steps of (a) receiving a service request that is transmitted from the user terminal, the service request being received at a first gateway and indicating a destination telephone number to which a call is to be placed; (b) determining if the first gateway can connect the call to the destination telephone number at less expense than another gateway can connect the call to the destination telephone number; and, if not, (c) transmitting a message to the user terminal from the first gateway, the message rejecting the service request and including an indication of at least one other gateway that is determined to be capable of connecting the call with less expense than the first gateway.

Although described in the context of a spread spectrum, CDMA system that uses bent pipe LEO satellites, the teachings of this invention are applicable as well to other types of modulation and access schemes, such as Time Division/Multiple Access (TDMA) systems, to satellites that perform on-board signal processing of communications traffic (e.g., regenerative repeaters), and to satellites in other orbital configurations, such as polar-orbiting LEO satellites, elliptically orbiting LEO satellites, satellites in Medium Earth Orbit configurations, and geosynchronous satellites. Furthermore, in some embodiments of this invention some or all of the user acceptance and/or logging-in functions can be performed on-board a satellite, either alone or in cooperation with one of the gateways 18. If the satellites are equipped with inter-satellite links (such as RF or optical links), then information can be passed between the satellites, and the user acceptance and/or logging-in functions as described above can be performed by two or more cooperating satellites, either alone or in combination with at least one gateway 18.

Thus, while the invention has been particularly shown and described with respect to preferred embodiments thereof, it will be understood by those skilled in the art that changes in form and details may be made therein without departing from the scope and spirit of the invention.

What is claimed is:

1. A satellite communications system, comprising:
   at least one communications satellite;
   a system controller;
   a plurality of gateways;
   at least one user terminal comprising means for bidirectionally communicating with at least one of said gateways through said at least one communications satellite; and
   a data communications network coupled between said system controller and said plurality of gateways such that said system controller selectively assigns system resources to individual ones of said plurality of gateways, over said data communications network, based at least in part on a predicted demand for system resources, said data communications network bidirectionally coupling together said plurality of gateways and said system controller and being transmitted through, at least in part, at least one earth orbiting satellite.

2. A satellite communications system as set forth in claim 1, wherein individual ones of said plurality of gateways are bidirectionally coupled to at least one terrestrial communications system, and wherein individual ones of said plurality of gateways comprise means for receiving an access request from said at least one user terminal through said at least one satellite, and further comprise means for notifying said requesting user terminal that the user terminal is one of accepted by the gateway for establishing a communication link with one of the terrestrial communications network or another user terminal, or is not accepted by the gateway for establishing the communication link.

3. A satellite communications system as set forth in claim 1, wherein individual ones of said plurality of gateways are bidirectionally coupled to a database of active, logged-in user terminals, and wherein individual ones of said plurality of gateways comprise means for receiving a log-in request from said at least one user terminal through said at least one satellite, and further comprise means for notifying said requesting user terminal of one of: (a) that the user terminal's log-in request has been accepted by the gateway for storage in the database; and (b) that the user terminal's log-in request has not been accepted by the gateway.

4. A satellite communications system as set forth in claim 1, wherein said data communications network is comprised of RF links between said at least one earth orbiting satellite and at least one of said plurality of gateways.

5. A satellite communications system as set forth in claim 1, wherein said data communications network is comprised of terrestrial RF links between at least two of said plurality of gateways.

6. A satellite communications system as set forth in claim 1, wherein said data communications network conveys information for coordinating the assignment of user terminals to individual ones of said gateways.

7. A satellite communications system as set forth in claim 1, wherein said at least one communications satellite is one of a constellation of communications satellites, and wherein said at least one earth orbiting satellite is one of said constellation of communications satellites.

8. A satellite communications system as set forth in claim 1, wherein said at least one communications satellite is one of a constellation of communications satellites, and wherein said at least one earth orbiting satellite is not one of said constellation of communications satellites.

9. A satellite communications system as set forth in claim 1, wherein said at least one communications satellite is one of a constellation of non-geosynchronous orbit communications satellites, and wherein said at least one earth orbiting satellite is a geosynchronous orbit satellite.

* * * * *